(12) United States Patent
Kwon et al.

(10) Patent No.: US 9,742,460 B2
(45) Date of Patent: Aug. 22, 2017

(54) SYSTEM AND METHOD FOR GENERATING EXACT SYMBOL ERROR RATES OF FREQUENCY-HOPPED SIGNALS

(71) Applicants: Wichita State University, Wichita, KS (US); The United States of America as represented by the Secretary of the Air Force, Washington, DC (US)

(72) Inventors: Hyuck M. Kwon, Wichita, KS (US); Khanh D. Pham, Albuquerque, NM (US)

(73) Assignees: Wichita State University, Wichita, KS (US); The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 14/926,746

(22) Filed: Oct. 29, 2015

(65) Prior Publication Data
US 2017/0126272 A1    May 4, 2017

(51) Int. Cl.
*H04B 1/692* (2011.01)
*H04L 27/20* (2006.01)
*H04L 27/26* (2006.01)
*H04L 1/00* (2006.01)
*H04B 7/08* (2006.01)
*H04B 1/69* (2011.01)

(52) U.S. Cl.
CPC .......... *H04B 1/692* (2013.01); *H04B 7/0857* (2013.01); *H04L 1/0071* (2013.01); *H04L 27/2003* (2013.01); *H04L 27/2082* (2013.01); *H04L 27/2695* (2013.01); *H04B 2001/6908* (2013.01)

(58) Field of Classification Search
CPC ..... H04B 1/692; H04B 7/0857; H04B 1/0071
USPC ........................................................ 375/131
See application file for complete search history.

(56) References Cited

U.S. PATENT DOCUMENTS

| 7,349,381 B1 * | 3/2008 | Clark ................... H04B 1/7156 370/350 |
| 2006/0135075 A1 * | 6/2006 | Tee ........................ H04L 5/0007 455/67.13 |
| 2006/0198292 A1 * | 9/2006 | Yoshii .................... H04B 1/715 370/208 |

(Continued)

OTHER PUBLICATIONS

Craig, "A New, Simple and Exact Result for Calculating the Probability of Error for Two-Dimensional Signal Constellations", Military Communications Conference, Nov. 1991, pp. 571-575.

(Continued)

*Primary Examiner* — Michael Neff
(74) *Attorney, Agent, or Firm* — Hovey Williams LLP

(57) ABSTRACT

A system and method for transmitting data over a wireless communication network. The method broadly includes generating a frequency hopping pattern spanning a plurality of time hops and a plurality of signal frequencies; generating a signal including a number of data symbols, the signal incorporating the frequency hopping pattern such that the symbols are distributed across the signal frequencies according to the frequency hopping pattern; transmitting the signal from a transmitting unit to a receiving unit over the wireless communication network; and generating an exact symbol error rate for the signal as received by the receiving unit.

20 Claims, 4 Drawing Sheets

(56) References Cited

U.S. PATENT DOCUMENTS

| | | | | |
|---|---|---|---|---|
| 2007/0092018 A1* | 4/2007 | Fonseka | ................ | H04L 1/0054 375/265 |
| 2007/0211786 A1* | 9/2007 | Shattil | .................... | H04B 1/707 375/141 |
| 2008/0298450 A1* | 12/2008 | Zhang | .................... | H04L 1/0006 375/227 |
| 2012/0324523 A1* | 12/2012 | Stadelmeier | ........ | H04L 27/2602 725/118 |
| 2014/0269841 A1* | 9/2014 | Goodman | .............. | H04B 1/715 375/133 |
| 2016/0095137 A1* | 3/2016 | Chen | .................... | H04W 72/04 370/329 |

OTHER PUBLICATIONS

Glaser, et al., "Protected MILSATCOM Design for Affordability Risk Reduction (DFARR)", Military Communications Conference, Nov. 18-20, 2013, pp. 998-1001.

Simon, et al., "A Unified Approach to the Performance Analysis of Digital Communication over Generalized Fading Channels", Proceedings of the IEEE, vol. 86, issue 9, Sep. 1998, pp. 1860-1877.

Goldsmith, Wireless Communication, 5th edition, Cambridge University Press, 2012, 427 pages.

Simon, et al., Digital Communication over Fading Channels, 2nd edition, Wiley-IEEE Press, Dec. 6, 2004, 551 pages.

Cook, "Current wideband MILSATCOM infrastructure and the future of bandwidth availability", Aerospace Conference, Mar. 7-14, 2009, pp. 23-28.

Torrieri, "Fundamental limitations on repeater jamming of frequency-hopping communications", IEEE Journal on Selected Areas in Communications, vol. 7, issue 4, May 1989 pp. 569-575.

Chau, "Optimal partial decision diversity for frequency-hopped satellite communications in shadowed Rician fading channel with partial-band jamming", Proceedings of IEEE 1993 Region 10 Conference on Computer, Communication, Control and Power Engineering,TENCON '93, Beijing, China, vol. 3, Oct. 19-21, pp. 123-126.

* cited by examiner

SYSTEM AND METHOD FOR GENERATING EXACT SYMBOL ERROR RATES OF FREQUENCY-HOPPED SIGNALS

FEDERALLY SPONSORED RESEARCH OR DEVELOPMENT

This invention was made with government support under Grant #R51249 awarded by the U.S. Air Force Research Laboratory, Grant #R51255 awarded by the United States Air Force Asian Office of Aerospace Research and Development (AOARD), and the 2015 Air Force Summer Facility Fellowship. The United States government has certain rights in the invention.

FIELD

The present invention relates to systems and methods for generating and using exact symbol error rates for wireless communications.

BACKGROUND

Frequency hopping refers to the transmission of wireless signals by rapidly switching frequencies using a pattern known to both the transmitter and the receiver. Most existing frequency hopping patterns are determined by two encryption keys, including one for the frequency domain and another for time permutation in the time domain. Such frequency hopping is beneficial because it reduces interference and/or noise and, thus, improves the success rate of signal packet transmission when transmitting a signal over a wireless communication network.

Both frequency-hopping and time-permutation keys used in the communications can reduce the probability of detection by malicious interferers or eavesdroppers. Signal interference such as partial-band tone interference (PBTI) and partial-band noise interference (PBNI) often are employed by malicious interferers to degrade the signal quality. For example, PBTI reduces the symbol error rate (SER) of the signal and degrades throughput efficiency by reducing the effective signal-to-noise ratio (SNR) of the user. Frequency hopping spread spectrum communication via pseudo random sequence key generation, in turn, is employed to make it difficult to interfere with messages. The SER of the transmitted signal is used in generating a frequency hopping pattern. However, the conventional systems and methods only approximates the symbol error rate according to simulations including, for example, the Chernoff upper bound.

SUMMARY OF THE INVENTION

The present invention solves the above-described problems and provides a distinct advance in the art of signal analysis and modification. More particularly, the present invention provides a system and method for generating an exact symbol error rate for a frequency hopping wireless communication system.

An embodiment of the present invention is a method of transmitting data over a wireless communication network. The method broadly includes the steps of generating a frequency hopping pattern spanning a plurality of time hops and a plurality of signal frequencies; generating a signal including a number of data symbols, the signal incorporating the frequency hopping pattern such that the symbols are distributed across the signal frequencies according to the frequency hopping pattern; transmitting the signal from a transmitting unit to a receiving unit over the wireless communication network according to the frequency hopping pattern; generating an exact symbol error rate for the signal as received by the receiving unit; transmitting the exact symbol error rate from the receiving unit to the transmitting unit over the wireless communication network; modulating the signal according to the exact symbol error rate; and transmitting the modulated signal to the receiving unit over the wireless communication network.

An additional embodiment of the present invention is directed to another method of transmitting data over a wireless communication network. The method broadly includes the steps of generating a slow frequency hopping pattern (i.e., multiple symbols per time hop); generating a signal subjected to additive white Gaussian noise (AWGN) and partial band tone interference; modulating the signal via M-ary phase-shift keying (MPSK), transmitting the signal from a transmitting unit to a receiving unit according to the slow frequency hopping pattern; generating an exact symbol error rate for the signal as received by the receiving unit; transmitting the exact symbol error rate from the receiving unit to the transmitting unit over the wireless communication network; modulating the signal according to the exact symbol error rate; and transmitting the modulated signal to the receiving unit over the wireless communication network.

Yet another embodiment of the present invention is directed to a system for transmitting data over a wireless communication network. The system broadly includes a transmitting unit for transmitting a signal over the wireless communication network and a receiving unit for receiving the signal. The transmitting unit may be configured to generate a slow frequency hopping pattern (i.e., multiple symbols per time hop); generate a signal subjected to additive white Gaussian noise (AWGN) and partial band tone interference; modulate the signal via M-ary phase-shift keying (MPSK); and transmit the signal from a transmitting unit to a receiving unit according to the slow frequency hopping pattern. The receiving unit may be configured to generate an exact symbol error rate for the signal based on the received signal and transmit the exact symbol error rate to the transmitting unit over the wireless communication network. The transmitting unit may also be configured to modulate the signal according to the exact symbol error rate and transmit the modulated signal to the receiving unit over the wireless communication network.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

Figure 1:
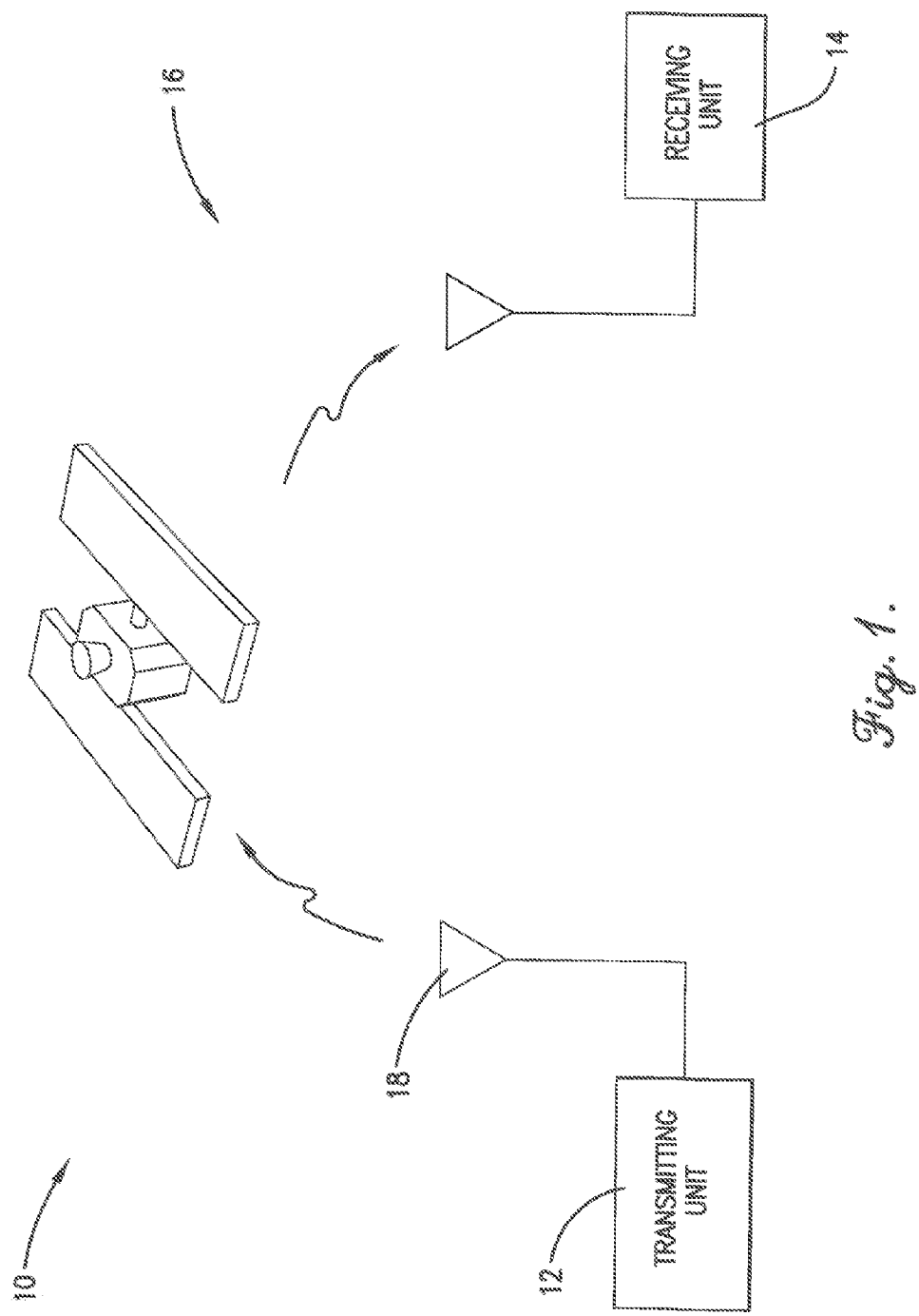
FIG. 1 is a schematic illustration of a transmitting unit, a satellite, and a receiving unit communicating over a wireless communication network in accordance with an embodiment of the present invention.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Figure 2:
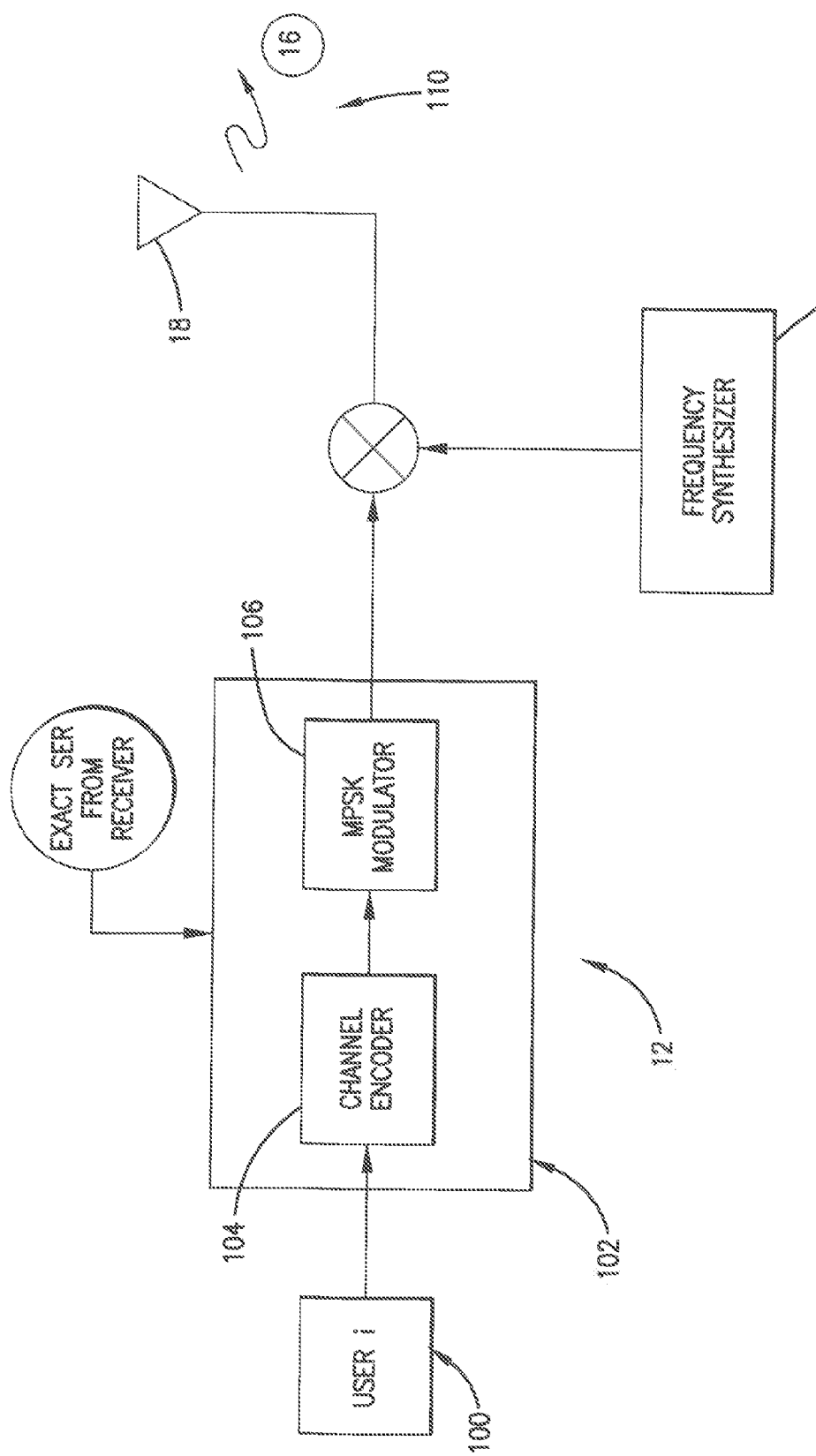
FIG. 2 is a flow diagram of signal transmission over the wireless communication network of FIG. 1.
Figure 3:
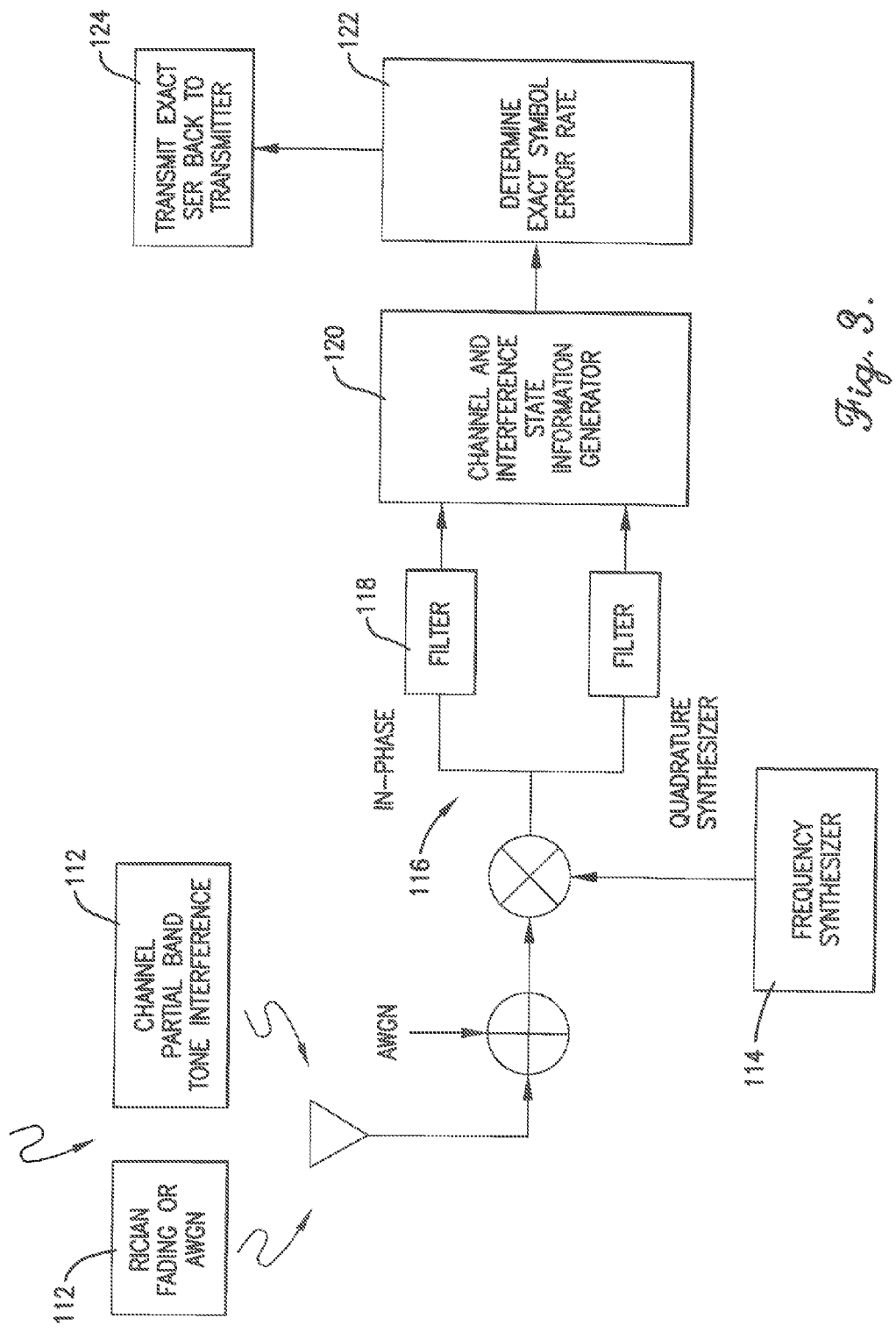
FIG. 3 is a continuation of the flow diagram of FIG. 2.

Turning now to the drawing figures, and particularly FIGS. 1-3, a wireless communication system 10 constructed in accordance with an embodiment of the invention is illustrated. The wireless communication system 10 broadly includes one or more transmitting units 12 and one or more receiving units 14. The wireless communication system 10 may employ intermediate communication nodes between the transmitting units 12 and the receiving units 14 for communicating over a wireless communication network 16, as described below.

The transmitting units 12 may be mobile smartphone devices, cellular devices, personal digital assistants, tablets, laptops, computers, radios, walkie-talkies, or any other device configured to communicate over the wireless communication network 16.

The wireless communication network 16 may be any wireless communication network such as a local area network, a wide area network, the internet, an intranet, or wireless networks such as the ones operated by AT&T, Verizon, or Sprint. The wireless communication network 16 may also be combined or implemented with several different networks.

The transmitting units 12 generate and transmit wireless communication signals and may be a "ground station" or other computing device including a processor, memory, transmitter 18 (e.g., transceiver), and/or other electronic circuitry or hardware or computer software for encoding the signals, modulating the signals, and transmitting the signals.

The processor may implement an application or computer program to perform some of the functions described herein. The application may comprise a listing of executable instructions for implementing logical functions in the user device. The application can be embodied in any computer readable medium for use by or in connection with an instruction execution system, apparatus, or device. The various actions and calculations described herein as being performed by or using the application may actually be performed by one or more computers, processors, or other computational devices, independently or cooperatively executing portions of the application.

The memory may be any computer-readable medium that can contain, store, communicate, propagate, or transport the application for use by or in connection with the instruction execution system, apparatus, or device. The computer readable medium can be, for example, but not limited to, an electronic, magnetic, optical, electro magnetic, infrared, or semiconductor system, apparatus, device or propagation medium. More specific, although not inclusive, examples of the computer readable medium would include the following: a portable computer diskette, a random access memory (RAM), a read only memory (ROM), an erasable, programmable, read only memory (EPROM or flash memory), and a portable compact disk read only memory (CDROM), and combinations thereof.

The intermediate nodes may be cellular towers, satellites (as shown in FIG. 1), relay stations, repeaters, computing devices (such as the ones described above) acting as relays, or any other unit configured to receive a wireless communication signal and transmit the signal to another relay or to one of the receiving units 14. The intermediate nodes may also be environmental objects such as buildings, ground surfaces, clouds, and other objects.

The receiving units 14 may be any computing device such as the computing devices described above and are configured to receive communication signals. For example, the receiving units 14 may be a "ground station" or other computing device including a processor, memory, transmitter (e.g., transceiver), and/or other electronic circuitry or hardware or computer software (as described above) for receiving signals, decoding signals, and demodulating signals.

Turning again to FIGS. 2 and 3, a signal may be transmitted according to the following steps. It will be understood that steps may be performed in different orders or simultaneously. Some steps may be omitted in certain embodiments and additional steps may be incorporated without limiting the scope of the invention.

First, a transmitting unit 12 generates a signal from user i (reference number 100). In some embodiments, the transmitting unit 12 may modulate the signal via adaptive code modulation (ACM), as shown by block 102.

For instance, the transmitting unit 12 may encodes the signal via encryption or other suitable encoding protocol, as shown by block 104.

The transmitting unit 12 may also modulate the signal via coherent M-ary phase shift keying (MPSK) or other suitable modulation scheme, as shown by block 106.

The transmitting unit 12 may also receive and superimpose or embed a frequency hopping pattern onto the signal, as shown by block 108.

The transmitting unit 12 then transmits the signal over the wireless network 16, as shown by block 110.

The signal may be subjected to fading, additive white Gausian noise, or interference, as shown by blocks 112.

The receiving unit 14 may receive the signal and passes it through a frequency synthesizer, as shown by block 114.

The received signal may then be down-converted to in-phase and quadrature phase baseband signal components, as shown by T-junction 116.

The signal may then pass through a root raised cosine (RRC) waveform-shaping filter, as shown by block 118.

The in-phase and quadrature phase components of the signal may then be passed through a channel and interference state information generator, as shown by block 120.

The exact symbol error rate of the signal may then be determined via an exact SER expression, as shown by block 122. Determination of the exact symbol error rate via the exact SER expression will be described in more detail below. Note that the transmitting unit 12 and the receiving unit 14 may attempt to minimize the symbol error rate while interferers may attempt to maximize the symbol error rate.

The exact SER then may be transmitted back to the transmitter 12 for modulating the signal, as shown in block 124.

The exact SER expression, as used for generating the exact SER in block 122, may be implemented in hardware by the receiver 14 or another component of the wireless communication system 10 and may be used for generation of the ACM against intentional interference, as shown in block 120. Instead of using a very slow and inaccurate simulation, the hardware can quickly and accurately calculate the SER at the receiver 14 with a few parameters such as the interference fraction ratio. The exact SER thus allows the transmitter 12 to select an appropriate modulation and error correction coding rate against the interference. Supplying the exact SER to the transmitter 12 is beneficial because if an inappropriate ACM out of possible ACM candidates is selected due to inaccurate SER information, then the receiver 14 may not demodulate the signal correctly and may frequently transmit a "no acknowledgement (NACK)" signal to the transmitter 12. If a channel is in poor condition due to severe interference, the transmitter 12 may need to frequently retransmit the signal. The bandwidth efficiency (or throughputs) would be degraded due to receiving the NACKs frequency sent by the receiver 14. If a channel is in good condition and a lower modulation and a lower error rate correction coding is selected due to incorrect SER information, then valuable bandwidth is wasted. Therefore, throughputs of the wireless communication system 10 under interference are enhanced by generating an exact SER via an exact SER expression.

Figure 4:
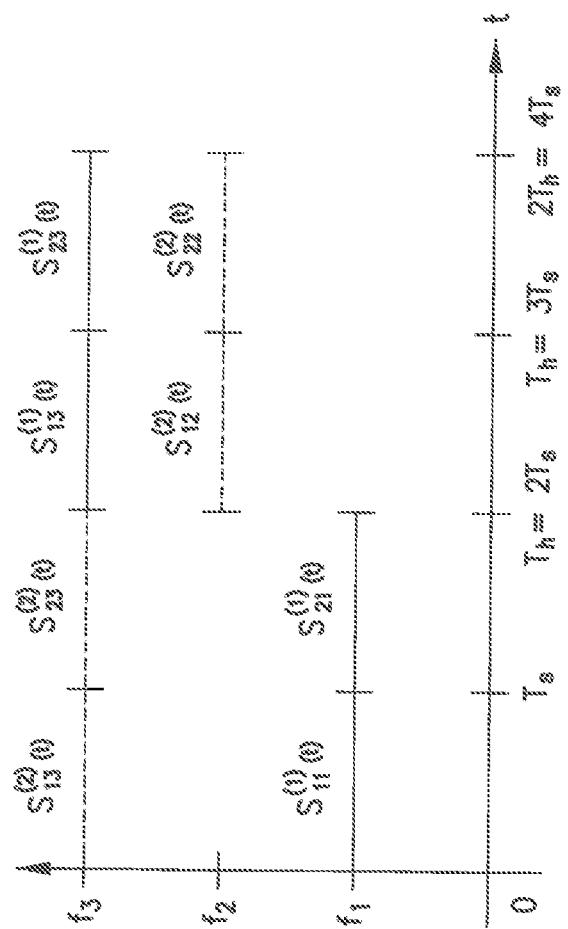
FIG. 4 is a graph of exemplary frequency hopping patterns of two signals.

Turning to FIG. 4, a simplified graphical example of two frequency hopping patterns is shown. The frequency hopping patterns (shown in solid linetype) span a number of time hops and a number of frequency channels. Within each time hop, the signals may include a number of symbols (i.e., data chunks).

Determination of the exact symbol error rate will now be summarized. For a given signal-to-noise ratio or signal-to-interference plus noise ratio $\gamma$, the exact symbol error rate (SER) for a frequency hopping pattern with MPSK under PBTI and Rician fading may be written as $$P_S(E|\gamma) = \frac{1}{\pi} \int_0^{(M-1)\pi/M} \exp\left[\frac{-g\gamma}{\sin^2\phi}\right] d\phi, \text{ where } g = \sin^2\frac{\pi}{M}.$$

The exact SER of a rectangular MQAM modulation may be written as $$P_S(E|\gamma) = 1 - \left(1 - \frac{2(\sqrt{M}-1)}{\sqrt{M}} Q\left(\sqrt{3\gamma/(M-1)}\right)\right)^2 =$$

-continued
$$1 - \left(1 - \frac{2(\sqrt{M}-1)}{\sqrt{M}} \frac{1}{\pi} \int_0^{\pi/2} \exp\left[\frac{-3\gamma/(M-1)}{2\sin^2\phi}\right] d\phi\right)^2.$$

This equation may be substituted into the above equation to find the exact SER for the frequency hopping pattern under MQAM.

A detailed, analytical discussion of the above exact symbol error rate determination follows. It will be understood that many of the equations, parameters, and assumptions used herein are merely for illustration purposes and are not intended to limit the scope of the invention.

Notations for the following discussion are as follows. The average value of a random variable X is denoted by upper bar $\overline{X}$. The expectation or average of the random variable X is denoted by E[X]. A vector is denoted by the bold lower case x. The transpose of vector x is denoted by $x^T$. The norm of vector x is denoted by $\|x\|$. The magnitude of a complex number x is denoted by $|x|$.

The entire frequency hopping spectrum may be divided into $N_f$ number of channels operating at frequencies $f_1, \ldots,$ and $f_{N_f}$. All channels may be independent of each other and may have a time hop interval denoted $T_h$. One data frame includes a number of time hops. Since a slow frequency hopping is being considered, multiple symbols are transmitted per hop. For example, FIG. 4 shows a frequency hopping pattern of 3 frequency channels, 2 time hops per frame, 2 symbols per hop, and 2 multiple access (MA) users sharing the entire frequency hopping spectrum. Note that FIG. 4 is shown just for an illustration purpose of the frequency hopping notations. The practical parameters may be different from these.

The transmitted signal for the k-th user may be denoted by $s_{ij}^{(k)}(t)$, where the superscript k denotes the user index, and subscripts i and j indicate the symbol index and frequency index in a time hop, respectively. In FIG. 4, the signals for user 1 are $s_{11}^{(1)}(t)$ and $s_{21}^{(1)}(t)$ for the hop 1 interval, and $s_{13}^{(1)}(t)$ and $s_{23}^{(1)}(t)$ for the hop 2 interval. The signals for user 2 are $s_{13}^{(2)}(t)$ and $s_{23}^{(2)}(t)$ for the hop 1 interval, and $s_{12}^{(2)}(t)$ and $s_{22}^{(2)}(t)$ for the hop 2 interval. Without loss of generality, if it is considered that user 1 uses frequency $f_1$ during hop 1, then the transmitted MPSK signal by user 1 can be written as $$s_{11}^{(1)}(t) = Ag(t)\cos\left[\frac{2\pi(i-1)}{M}\right]\cos[2\pi f_1 t] - Ag(t)\sin\left[\frac{2\pi(i-1)}{M}\right]\sin[2\pi f_1 t] \, i = 1, \ldots, M,$$

where $0 \le t \le T_s$, A is the amplitude of the signal, g(t) is the waveform shaping filter, e.g., a root raised cosine filter (RRC), and i denotes the transmitted symbol out of M possible symbols.

In this analysis, Rician fading may be assumed with channel coefficient $h_1 = |h_1|e^{j\theta_1}$, where $|h_1|$ and $\theta_1$ are the Rician amplitude and the uniformly distributed angle of $h_1$, respectively. It may also be assumed that the transmitting unit 12 is constantly being subjected to partial band tone interference (PSTI). The PBTI signal j(t) during the first hop interval $0 \le t \le T_h$ for the first symbol against the signal for user 1 may be written as $$j(t) = \begin{cases} \sqrt{2} A_J \cos[2\pi f_1 t + \phi_J] & \text{if user 1 signal is compromised} \\ 0 & \text{if user 1 signal is not compromised} \end{cases},$$

where $A_j$ is the amplitude of the interfering tone signal, and $\theta_j$ is the interference, signal phase with uniform distribution $\theta_j \sim (0, 2\pi)$.

The received signal is multiplied by a receiver post processing gain $\alpha_1$ if a single antenna employed or a receiver spatial domain beam-forming (SDBF) vector $\alpha = (\alpha_1, \ldots, \alpha_{M_r})^T$ if $M_r$ number of multiple antennas are used. A single antenna receiver and Rician fading with channel efficient $h_1$ may be assumed and estimated through the inserted pilot or reference symbols in a frame. Then, the receiver post processing gain $\alpha_1$ may be set at $\alpha_1 = a_1 e^{-j\theta_1}$ because of the available channel state information. The receiver post processing gain $\alpha_1$ can be chosen to maximize the received signal-to-interference plus noise power ratio (SINR) denoted by $\gamma$. The post-processing signal can be written as $$r(t) = [h_1 s_{11}^{(1)}(t) + j_1(t) + n_1(t)]\alpha_1 = |h_1|a_1 s_{11}^{(1)}(t) + j_1(t)\alpha_1 e^{-j\theta_1} + n_1(t)\alpha_1 e^{-j\theta_1}.$$

Then, the received signal $r(t)$ may be down-converted in frequency to in-phase (I) and quadrature-phase (Q) baseband signal components using two orthonormal basis functions $\phi_1(t)$ and $\phi_2(t)$, as shown by T-junction 116 of FIG. 3, and passed through filters matched to the RRC waveform-shaping filter $g(t)$, as shown by block 116 of FIG. 3. Then, samples are taken of every symbol interval $T_s$ at each I and Q branch, as shown in block 120. For the remainder of this analysis, without loss of generality, the subscripts used for user 1, symbol time 1, hop 1, and frequency $f_1$ are dropped. This is because independent symbol-by-symbol decisions can be assumed.

The terms $r_1$ and $r_2$ may denote I and Q branch samples, respectively, for the user 1 signal. The following equalities $r = (r_1, r_2)^T$, $s = (s_1, s_2)^T$, $j = (j_1, j_2)^T$, and $n = (n_1, n_2)^T$ may denote the received signal, the transmitted signal component, the interference signal component, and the noise component vector, respectively. Here, $r_i = \langle r(t), \phi_i(t) \rangle$ is an inner product of $r(t)$ and $\phi_i(t)$, which is the projection of the received signal into the base function $\phi_i(t)$, $i=1,2$. The received signal vector may be written as $$r = \begin{cases} |h_1|a_1 s + a_1 j + a_1 n & \text{if compromised} \\ |h_1|a_1 s + a_1 n & \text{if uncompromised} \end{cases}.$$

Hence, the received SINR or signal-to-noise power ratio (SNR) $\gamma$, depending on the interference conditions, may be written as $$\gamma = \begin{cases} \dfrac{E[\||h_1|a_1 s\|^2]}{E[\|a_1 j + a_1 n\|^2]} = \dfrac{(|h_1|a_1)^2 P_S}{(a_1)^2 (P_J + P_N)} & \text{if compromised} \\ \dfrac{E[\||h_1|a_1 s\|^2]}{E[\|a_1 n\|^2]} = \dfrac{(|h_1|a_1)^2 P_S}{(a_1)^2 P_N} & \text{if uncompromised} \end{cases},$$

where $P_S = E[\|s\|^2]$, $P_J = E[\|j\|^2]$, and $P_N = E[\|n\|^2]$ denote the signal component, the interference signal component, and noise component power, respectively. It may be assumed that the interference signal phase $\theta_j$ is equal to the desired signal phase for the worst case consideration. In addition, it can be assumed that the PBTI and PBNI for simplification and the same interference power is simply added to the WGN power. By applying the Cauchy-Schwartz inequality $(|\langle x,y \rangle|^2 \leq \|x\|^2 \|y\|^2$, with these terms being equal if and only if $x = cy$ for any constant $c$) to the above equation, the maximum $\gamma$ can be achieved when $\alpha_1$ is proportional to $|h_1|$. Hence, $\alpha_1$ may be chosen as $$a_1 = \begin{cases} \dfrac{|h_1|}{\sqrt{P_J + P_N}} & \text{if compromised} \\ \dfrac{|h_1|}{\sqrt{P_N}} & \text{if uncompromised} \end{cases}.$$

Note that $(\alpha_1)^2$ can directly cancel each other in the numerator and the denominator. However, when the receiver employs $M_r$ number of multiple antennas, the terms $(|h_1|\alpha_1)^2$ and $(\alpha_1)^2$ used for the single-antenna case in the numerator and denominator will be changed to $(\Sigma_{i=1}^{M_r} |h_i|\alpha_i)^2$ and $\Sigma_{i=1}^{M_r} \alpha_i^2$ respectively. Therefore, the Cauchy-Schwartz inequality will be useful for determining the optimum weighting vector $\alpha = (\alpha_i, \ldots, \alpha_{M_r})^T$, which is proportional to the channel magnitude vector $h_{mag} = (|h_1|, \ldots, |h_{M_r}|)^T$. Then, when the optimum weighting vector is used, the maximum instantaneous SINR or maximum SNR can be written as $$\gamma_{max} = \begin{cases} \dfrac{(|h_1|)^2 P_S}{(P_J + P_N)} & \text{if compromised} \\ \dfrac{(|h_1|)^2 P_S}{P_N} & \text{if uncompromised} \end{cases}.$$

Here, the noise component power can be written as $P_N = N_0 B = N_0/T_s$. This is because the signal channel bandwidth B is approximately equal to $1/T_s$. The entire frequency hopping spectrum bandwidth may be denoted as W with $W = N_f B$. The PBTI power per tone may be written as $$P_J = A_J^2 = \frac{P_{J,total}}{\text{Number of } PBTJ \text{ tones in } W} = \frac{P_{J,total}}{\beta \frac{W}{B}} = \frac{N_J B}{\beta} = \frac{N_J}{\beta T_s},$$

where $\beta$ denotes the interference fraction ratio $0 < \beta \leq 1$, and $N_J$ denotes the equivalent interference power spectral density, which is $$N_J = \frac{P_{J,total}}{W}.$$

If a random frequency hopping pattern is assumed, then the interference fraction ratio $\beta$ is equal to the probability of a frequency tone being compromised. This is because:

$$Pr(\text{A signal tone is compromised by } PBTI) =$$

$$\frac{\text{Number of Tones Compromised by } PBTI}{\text{Total Number of Tones}} = \frac{\beta \frac{W}{B}}{\frac{W}{B}} = \beta.$$

Hence, $\gamma_{max}$ can be rewritten as $$\gamma_{max} = \begin{cases} \dfrac{(|h_1|)^2 P_S}{\left(\dfrac{N_J}{\beta T_S} + N_0 \dfrac{1}{T_S}\right)} = \dfrac{(|h_1|)^2 E_S}{\left(\dfrac{N_J}{\beta} + N_0\right)} = & \text{if compromised} \\ \dfrac{(|h_1|)^2}{\left(\dfrac{1}{\beta E_S/N_J} + \dfrac{1}{E_S/N_0}\right)} & \text{with prob.}\beta \\ \dfrac{(|h_1|)^2 P_S}{N_0 \dfrac{1}{T_S}} = \dfrac{(|h_1|)^2 E_S}{N_0} & \text{if uncompromised} \\ & \text{with prob.}(1-\beta). \end{cases}$$

The purpose of PBTI is to minimize SINR $\gamma$, whereas the purpose of receiver beam forming (BF) is to maximize $\gamma$. This min-max problem may be written as $$\min_{\beta, 0 < \beta \leq 1} \max_{\alpha_1 \geq 0} \gamma(\alpha_1, \beta).$$

For a given instantaneous SNR or SINR $\gamma$, the exact SER of frequency hopping MPSK under PBTI and Rician fading can be obtained using Craig's formula such that $$P_S(E|\gamma) = \frac{1}{\pi} \int_0^{(M-1)\pi/M} \exp\left[\frac{-g\gamma}{\sin^2\phi}\right] d\phi, \text{ where } g = \sin^2\frac{\pi}{M}.$$

The average SER of frequency hopping MPSK over Rician fading and the interference state random variable J can be written as $$\overline{P}_s(E) = E_{\gamma_J}[P_S(E|\gamma,J)] = E_{\gamma_J}[P_S(E|\gamma_J, J=1)]Pr[J=1] + E_{\gamma_N}[P_s(e|\gamma_N, J=0)]Pr[J=0]$$

where $J=1$ and $J=0$ denote the presence and absence of PBTI, respectively, at the desired signal tone, hop, and symbol time of interest. Hence, $Pr[J=1]$ and $Pr[J=0]$ could be $\beta$ and $(1-\beta)$, respectively. The SINR and SNR may be written, respectively, as $$\gamma_J = \frac{(|h_1|)^2}{\left(\dfrac{1}{\beta E_S/N_J} + \dfrac{1}{E_S/N_0}\right)} \text{ and } \gamma_N = \frac{(|h_1|)^2 E_S}{N_0}.$$

Note that both $\gamma_J$ and $\gamma_N$ are Rician fading. In addition, $$E_{\gamma_J}[P_S(E|\gamma_J, J=1)] = \int_0^\infty P_S(E|\gamma_J, J=1) p_{\gamma_J}(\gamma_J) d\gamma_J =$$

$$\int_0^\infty \frac{1}{\pi} \int_0^{(M-1)\pi/M} \exp\left[\frac{-g\gamma_J}{\sin^2\phi}\right] d\phi\, p_{\gamma_J}(\gamma_J) d\gamma_J =$$

$$\frac{1}{\pi} \int_0^{(M-1)\pi/M} \int_0^\infty \exp\left[\frac{-g\gamma_J}{\sin^2\phi}\right] p_{\gamma_J}(\gamma_J) d\gamma_J d\phi =$$

$$\frac{1}{\pi} \int_0^{(M-1)\pi/M} \int_0^\infty \exp\left[\frac{-g\gamma_J}{\sin^2\phi}\right] p_{\gamma_J}(\gamma_J) d\gamma_J d\phi =$$

$$\frac{1}{\pi} \int_0^{(M-1)\pi/M} M_{\gamma_J}\left(\frac{-g}{\sin^2\phi}\right) d\phi =$$

$$\frac{1}{\pi} \int_0^{(M-1)\pi/M} \frac{(1+K)}{(1+K) + \dfrac{g}{\sin^2\phi}\overline{\gamma}_J} \exp\left[\frac{-K\dfrac{g}{\sin^2\phi}\overline{\gamma}_J}{(1+K) + \dfrac{g}{\sin^2\phi}\overline{\gamma}_J}\right] d\phi$$

where $M_{\gamma_J}(s)$ is the moment generating function (MGF) of $\gamma_J$, i.e., $M_{\gamma_J}(s) = E_{\gamma_J}[e^{s\gamma_J}]$. The MGFs for various fading environments can be written as follows. For Rayleigh fading, $$M_{\gamma_J}\left(\frac{-g}{\sin^2\phi}\right) = \left(1 + \frac{g\overline{\gamma}_J}{\sin^2\phi}\right)^{-1}.$$

For Rician fading with factor K, $$M_{\gamma_J}\left(\frac{-g}{\sin^2\phi}\right) = \frac{(1+K)\sin^2\phi}{(1+K)\sin^2\phi + g\overline{\gamma}_J} \exp\left[\frac{-Kg\overline{\gamma}_J}{(1+K)\sin^2\phi + g\overline{\gamma}_J}\right].$$

For Nakagami-m fading, $$M_{\gamma_J}\left(\frac{-g}{\sin^2\phi}\right) = \left(1 + \frac{g\overline{\gamma}_J}{m\sin^2\phi}\right)^{-m}.$$

The results are applicable for other modulations by modifying Craig's formula and for other fading environments by finding the corresponding MGF for the other fading. For example, the exact SER of a rectangular MQAM modulation can be written as $$P_S(E|\gamma) = 1 - \left(1 - \frac{2(\sqrt{M}-1)}{\sqrt{M}} Q\left(\sqrt{3\gamma/(M-1)}\right)\right)^2 =$$

$$1 - \left(1 - \frac{2(\sqrt{M}-1)}{\sqrt{M}} \frac{1}{\pi} \int_0^{\pi/2} \exp\left[\frac{-3\gamma/(M-1)}{2\sin^2\phi}\right] d\phi\right)^2$$

where $\gamma$ is the instantaneous SNR under fading but is the averaged SNR over all possible M-ary constellation points for a given fading coefficient. Substituting the above equation into Craig's formula, the exact SER of the frequency hopping MQAM under PBTI plus Rician fading can be found. For simplicity, the remainder of the analysis will assume Rician fading and MPSK modulation.

The average SINR $\overline{\gamma}_J$ over the Rician fading under the PBTI condition may be calculated as $$\overline{\gamma}_J = E_{|h_1|^2}\left[\frac{(|h_1|)^2}{\left(\dfrac{1}{\beta E_S/N_J} + \dfrac{1}{E_S/N_0}\right)}\right] = \frac{1}{\left(\dfrac{1}{\beta E_S/N_J} + \dfrac{1}{E_S/N_0}\right)} E_{|h_1|^2}[|h_1|^2].$$

The $E_{|h_1|^2}[|h_1|^2]$ can be computed as $E_{|h_1|^2}[|h_1|^2] = \sigma\sqrt{\pi/2} L_{1/2}(-s^2/2\sigma^2) = \sigma\sqrt{\pi/2} L_{1/2}(-K)$, where $2\sigma^2$ is the non-line-of-sight (NLOS) component power, $s^2$ is the LOS component power, and $K = s^2/2\sigma^2$ is the ratio of the line-of-sight (LOS) over NLOS component power called the Rician factor. Here, the $L_{1/2}(x)$ is the Laguerre polynomial, written as $$L_{1/2}(x) = e^{x/2}\left[(1-x)I_0\left(\frac{-x}{2}\right) - xI_1\left(\frac{-x}{2}\right)\right],$$

where $I_0(x)$ and $I_1(x)$ are the zeroth order and the first-order modified Bessel function of the first kind, respectively. Without loss of generality, if it is assumed that $\sigma^2 = 1$, then $$E_{|h_1|^2}[|h_1|^2] = \sigma\sqrt{\pi/2}\, L_{1/2}(-s^2/2\sigma^2) =$$

$$\sqrt{\pi/2}\, L_{1/2}(-K) = \sqrt{\pi/2}\, e^{-K/2}\left[(1+K)I_0\left(\frac{K}{2}\right) + KI_1\left(\frac{K}{2}\right)\right];$$

$$\bar{\gamma}_J = \frac{1}{\left(\frac{1}{\beta E_S/N_J} + \frac{1}{E_S/N_0}\right)} \sqrt{\pi/2}\, e^{-K/2}\left[(1+K)I_0\left(\frac{K}{2}\right) + KI_1\left(\frac{K}{2}\right)\right].$$

Substituting $\bar{\gamma}_J$ into the above equation for $E_{\gamma_J}[P_s(E|\gamma_J,J=1)]$, the exact conditional SER of the frequency hopping MPSK, given a PBTI condition, can be found. The above equations can be repeated to obtain the conditional average SER under no interference as $$E_{\gamma_N}[P_S(E|\gamma_J, J=0)] = \int_0^\infty P_S(E|\gamma_N, J=0) p_{\gamma_N}(\gamma_N) d\gamma_N =$$

$$\frac{1}{\pi} \int_0^{(M-1)\pi/M} \frac{(1+K)}{(1+K) + \frac{g}{\sin^2\phi}\bar{\gamma}_N} \exp\left[\frac{-K\frac{g}{\sin^2\phi}\bar{\gamma}_N}{(1+K) + \frac{g}{\sin^2\phi}\bar{\gamma}_N}\right] d\phi,$$

where $\bar{\gamma}_N = \frac{E_S}{N_0}\sqrt{\frac{\pi}{2}}\, e^{-K/2}\left[(1+K)I_0\left(\frac{K}{2}\right) + KI_1\left(\frac{K}{2}\right)\right]$.

Therefore, the overall averaged exact SER of the frequency hopping MPSK under PBTI and Rician fading can be written as $$\bar{P}_S(E|\beta) =$$

$$\frac{1}{\pi} \int_0^{(M-1)\pi/M} \frac{(1+K)}{(1+K) + \frac{g}{\sin^2\phi}\bar{\gamma}_J} \exp\left[\frac{-K\frac{g}{\sin^2\phi}\bar{\gamma}_J}{(1+K) + \frac{g}{\sin^2\phi}\bar{\gamma}_J}\right] d\phi \cdot \beta +$$

$$\frac{1}{\pi} \int_0^{(M-1)\pi/M} \frac{(1+K)}{(1+K) + \frac{g}{\sin^2\phi}\bar{\gamma}_N} \exp\left[\frac{-K\frac{g}{\sin^2\phi}\bar{\gamma}_N}{(1+K) + \frac{g}{\sin^2\phi}\bar{\gamma}_N}\right] d\phi \cdot (1-\beta).$$

The average SER for a given interference fraction ratio $\beta$ can be rewritten as $$\bar{P}_S(E|\beta) = \frac{1}{\pi} \int_0^{(M-1)\pi/M} \left[ \frac{\beta(1+K)}{(1+K) + \frac{g}{\sin^2\phi}\dfrac{1}{\left(\frac{1}{\beta E_S/N_J} + \frac{1}{E_S/N_0}\right)}} \cdot \right.$$
$$\sqrt{\pi/2}\, e^{-\frac{K}{2}}\left[(1+K)I_0\left(\frac{K}{2}\right) + KI_1\left(\frac{K}{2}\right)\right]$$

$$\exp\left(\frac{-K\frac{g}{\sin^2\phi}\left(\frac{1}{\left(\frac{1}{\beta E_S/N_J} + \frac{1}{E_S/N_0}\right)}\right)}{(1+K) + \frac{g}{\sin^2\phi}\left(\frac{1}{\left(\frac{1}{\beta E_S/N_J} + \frac{1}{E_S/N_0}\right)}\right)}\right) \cdot$$

$$\left. \sqrt{\pi/2}\, e^{-\frac{K}{2}}\left[(1+K)I_0\left(\frac{K}{2}\right) + KI_1\left(\frac{K}{2}\right)\right] \right] d\phi +$$

$$\frac{1}{\pi} \int_0^{(M-1)\pi/M} \frac{(1-\beta)(1+K)}{(1+K) + \frac{g}{\sin^2\phi}\bar{\gamma}_N} \exp\left[\frac{-K\frac{g}{\sin^2\phi}\bar{\gamma}_N}{(1+K) + \frac{g}{\sin^2\phi}\bar{\gamma}_N}\right] d\phi.$$

The average bit error rate of the frequency hopping MPSK under PBTI and Rician fading for a given interference fraction ratio $\beta$ can be obtained using $$\bar{P}_b(E|\beta) \approx \frac{1}{\log_2(M)} \bar{P}_S(E|\beta).$$

Here, Gray encoding can be assumed so that the neighbor signal constellations are only one bit different from the desired symbol constellation point For a special case, the Rician factor K under only AWGN and PBTI becomes infinity. As such, the exact SER of the frequency hopping MPSK under AWGN and PBTI can be written as $$P_S(E|\beta) = \frac{1}{\pi} \int_0^{(M-1)\pi/M} \exp\left[-\frac{g}{\sin^2\phi}\gamma_N\right] d\phi \cdot (1-\beta) +$$

$$\frac{1}{\pi} \int_0^{(M-1)\pi/M} \exp\left[-\frac{g}{\sin^2\phi}\gamma_J\right] d\phi \cdot \beta$$

where $SNR_{\gamma_N} = E_S/N_0$ and $SINR_{\gamma_J} = \dfrac{1}{\left(\frac{1}{\beta E_S/N_J} + \frac{1}{E_S/N_0}\right)}$.

Thus, the fist and second terms represent the exact SER when the signal is not compromised with probability $(1-\beta)$ and compromised with probability respectively. The optimum interference fraction $\beta$, which maximizes the average conditional SER $\bar{P}_s(E|\beta)$ can be numerically found by taking the derivative of the equation for $\bar{P}_s(E|\beta)$ (above) with respect to $\beta$ for a given set of parameters, such as $E_s/N_J$, $E_s/N_0$, and M, and Rician fading factor K. The optimum $\beta$ should satisfy the following equation $$\frac{1}{\pi} \int_0^{(M-1)\pi/M} \frac{(1+K)}{(1+K) + \frac{g}{\sin^2\phi}\bar{\gamma}_N} \exp\left[\frac{-K\frac{g}{\sin^2\phi}\bar{\gamma}_N}{(1+K) + \frac{g}{\sin^2\phi}\bar{\gamma}_N}\right] d\phi =$$

$$\frac{1}{\pi} \int_0^{(M-1)\pi/M} \left[\frac{-g\bar{\gamma}_J N_J \sin^2\phi(1+K)}{\beta(1+K)\sin^2\phi + g\bar{\gamma}_J\beta} + \exp\left(\frac{-Kg\bar{\gamma}_J}{(1+K)\sin^2\phi + g\bar{\gamma}_J}\right)\right.$$

-continued $$\left. \begin{array}{c} g\bar{\gamma}_J \cdot \sin^2\phi \cdot (1+K)\left(N_0 K + \dfrac{\beta - K}{\beta}\right) + \\ \dfrac{(1+K)^2 \cdot \sin^4\phi \cdot (N_0\beta + N_J)}{g\bar{\gamma}_J + (1+K) \cdot \sin^2\phi} \end{array} \right] d\phi.$$

Using Newton's method, the optimum β may be solved.

The above analysis shows derivations for an exact symbol error rate expression for the frequency hopping system under partial-band tone interference and Rician fading environments. The expressions may be extended to other fading environments such as Rayleigh and Nakagami fading and other modulations such as MQAM. In addition, optimum weighting coefficients called beamforming coefficients may be found to minimize SER when channel coefficients are available. Furthermore, an implicit expression of the worst PBTI fraction ratio, which maximizes the SER of the frequency hopping system is presented. When the non-line-of-sight (NLOS) component in Rician fading is stronger than the line-of-sight (LOS) component, that is, when the Rician factor K is small such as 0.1 to 0.9, the worst PBTI fraction ratio is 1. On the other hand, when Rician factor K gets larger than 1 and interference power weakens, the optimum interference fraction can be smaller than 1. For this case, narrowband PBTI is more effective than wideband PSTI.

The present invention provides many advantages over the prior art. For example, the present invention may be used for efficient frequency hopping satellite and mobile communications when a coherent MPSK frequency hopping modulation is employed under severe fading and/or in a severe PBTI environment. Specifically, the numerically obtained results may be useful for the protected satellite waveform design, which may employ game theory between desired users and interferers. The present invention may be used for joint tactical information distribution systems (JTIDS), multifunctional information distribution systems (MIDS), single-channel ground airborne radio systems (SINC-GARS), and other communication systems.

The present invention advantageously improves the process of wireless signal transmission. For example, the present invention improves signal analysis and frequency hopping pattern generation by generating an exact symbol error rate for the transmitted signal.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method of transmitting data over a wireless communication network, the method comprising the steps of:
generating a frequency hopping pattern spanning a plurality of time hops and a plurality of signal frequencies;
generating a signal including a plurality of data symbols, the signal incorporating the frequency hopping pattern such that the symbols are distributed across the signal frequencies according to the frequency hopping pattern;
transmitting the signal from a transmitting unit to a receiving unit over the wireless communication network;
generating via the receiving unit an exact symbol error rate for the signal as received by the receiving unit;
transmitting the exact symbol error rate from the receiving unit to the transmitting unit over the wireless communication network;
modulating via the transmitting unit the signal according to the exact symbol error rate; and
transmitting the modulated signal to the receiving unit over the wireless communication network.

2. The method of claim 1, further comprising the step of modulating the signal via coherent modulation.

3. The method of claim 1, further comprising the step of modulating the signal via M-ary phase-shift keying (MPSK).

4. The method of claim 1, further comprising the step of modulating the signal via M-ary quadrature amplitude modulation (MQAM).

5. The method of claim 1, wherein the frequency hopping pattern is a slow frequency hopping pattern such that more than one symbol is included per time hop.

6. The method of claim 1, wherein the signal is subjected to additive white Gaussian noise (AWGN), Rician fading, Nakami fading, and/or Rayleigh fading.

7. The method of claim 1, wherein the signal is subjected to partial band tone interference (PBTI).

8. The method of claim 1, wherein the signal is subjected to partial band noise interference (PBNI).

9. The method of claim 1, further comprising the step of modulating the signal via bit-interleaved coded modulation (BICM).

10. The method of claim 1, further comprising the step of relaying the modulated signal between the transmitting unit and the receiving unit.

11. The method of claim 1, wherein the modulated signal is configured to be down-converted in frequency to in-phase and quadrature-phase baseband signal components.

12. The method of claim 1, further comprising the step of modulating the signal via noncoherent, nonorthogonal, continuous-phase frequency-shift keying (CPFSK).

13. The method of claim 12, wherein the step of modulating the signal via noncoherent, nonorthogonal, CPFSK includes modulating the signal via bit-interleaved coded modulation (BICM).

14. The method of claim 1, further comprising the step of encoding the signal via encryption.

15. The method of claim 1, wherein the modulated signal is configured to be passed through a frequency synthesizer.

16. The method of claim 1, wherein the step of generating the exact symbol error rate includes creating an optimum weighting vector to determine a maximum instantaneous signal-to-interference plus noise power ratio.

17. The method of claim 1, wherein the step of generating the exact symbol error rate includes creating an optimum weighting vector to determine a maximum instantaneous signal-to-noise power ratio.

18. The method of claim 1, wherein the step of generating the exact symbol error rate includes determining an optimum interference fraction in which an average conditional signal error rate is maximized.

19. A method of transmitting data over a wireless communication network, the method comprising the steps of:
generating a slow frequency hopping pattern spanning a plurality of time hops and a plurality of signal frequencies;
generating a signal including a plurality of symbols, the signal incorporating the frequency hopping pattern such that the symbols embody the frequency hopping pattern, the symbol, the frequency hopping pattern including more than one symbol per time hop, the signal being subjected to additive white gaussian noise (AWGN) and partial band tone interference;

modulating the signal via M-ary phase-shift keying (MPSK);

transmitting the signal from a transmitting unit to a receiving unit over the wireless communication network;

generating via the receiving unit an exact symbol error rate for the signal as received by the receiving unit;

transmitting the exact symbol error rate from the receiving unit to the transmitting unit over the wireless communication network;

modulating via the transmitting unit the signal according to the exact symbol error rate; and transmitting the modulated signal to the receiving unit over the wireless communication network.

20. A system for transmitting data over a wireless communication network, the system comprising:

a transmitting unit comprising:

a processor configured to generate a frequency hopping pattern spanning a plurality of time hops and a plurality of signal frequencies and generate a signal including a plurality of data symbols, the signal incorporating the frequency hopping pattern such that the symbols are distributed across the signal frequencies according to the frequency hopping pattern;

a transceiver configured to transmit the signal over the wireless communication network; and a receiving unit comprising:

a processor configured to generate an exact symbol error rate for the signal received from the transmitting unit; and a transceiver configured to transmit the exact symbol error rate to the transmitting unit over the wireless communication network, the processor of the transmitting unit being configured to modulate the signal according to the exact symbol error rate, the transceiver of the transmitting unit being configured to transmit the modulated signal over the wireless communication network.

* * * * *